May 29, 1923.
E. G. WHITMORE
MOTION PICTURE APPARATUS
Filed Jan. 27, 1919
1,457,012
3 Sheets-Sheet 1
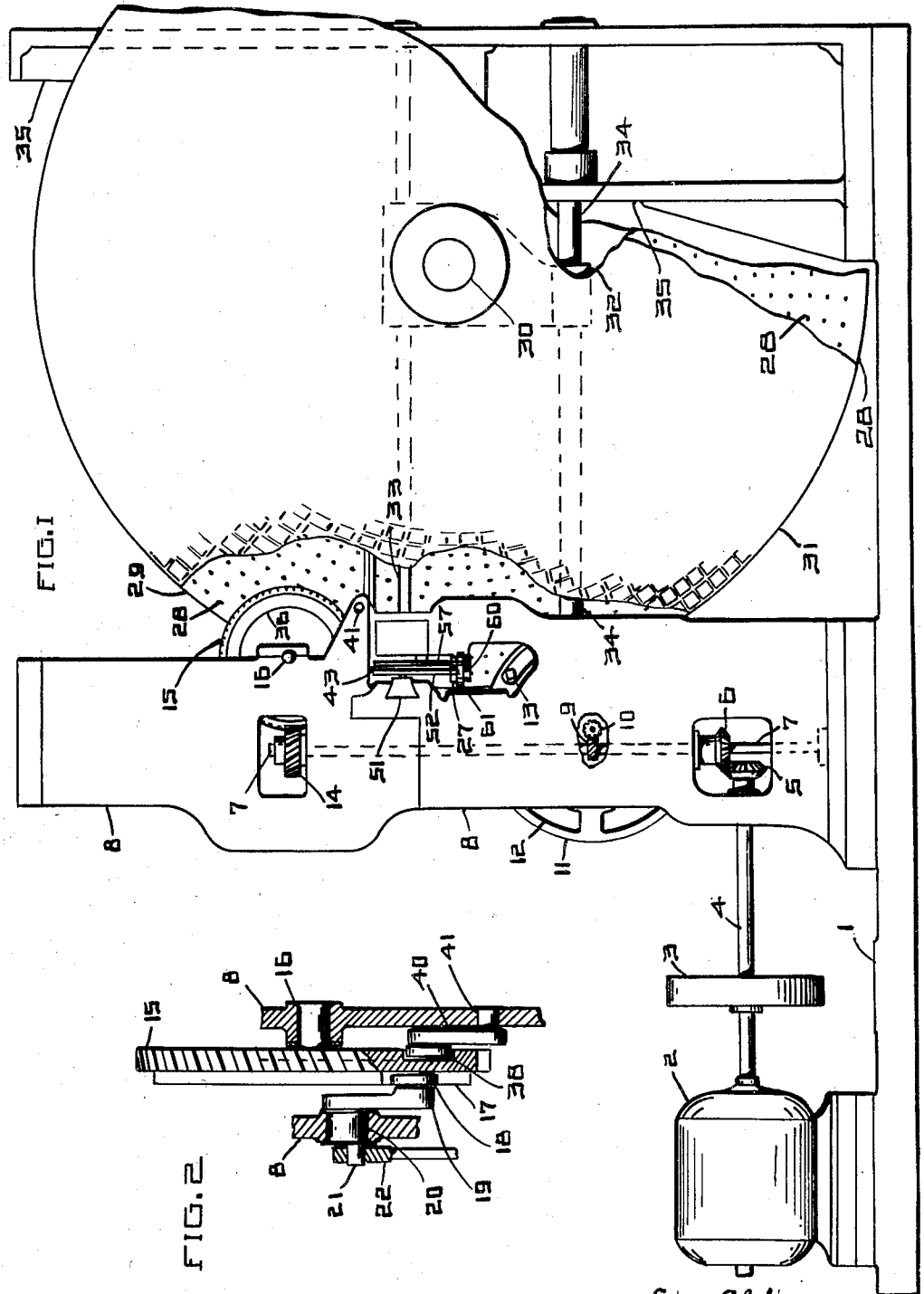

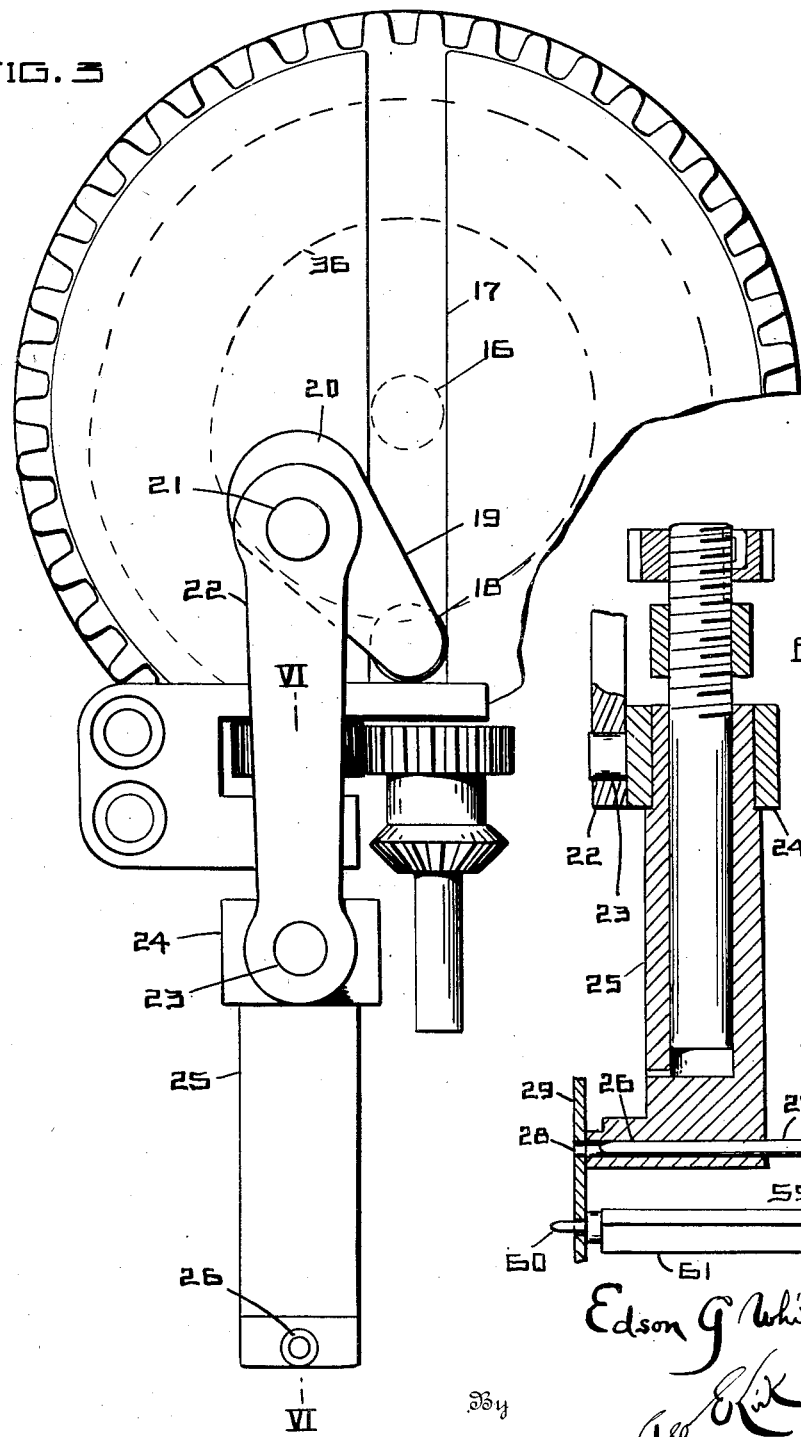

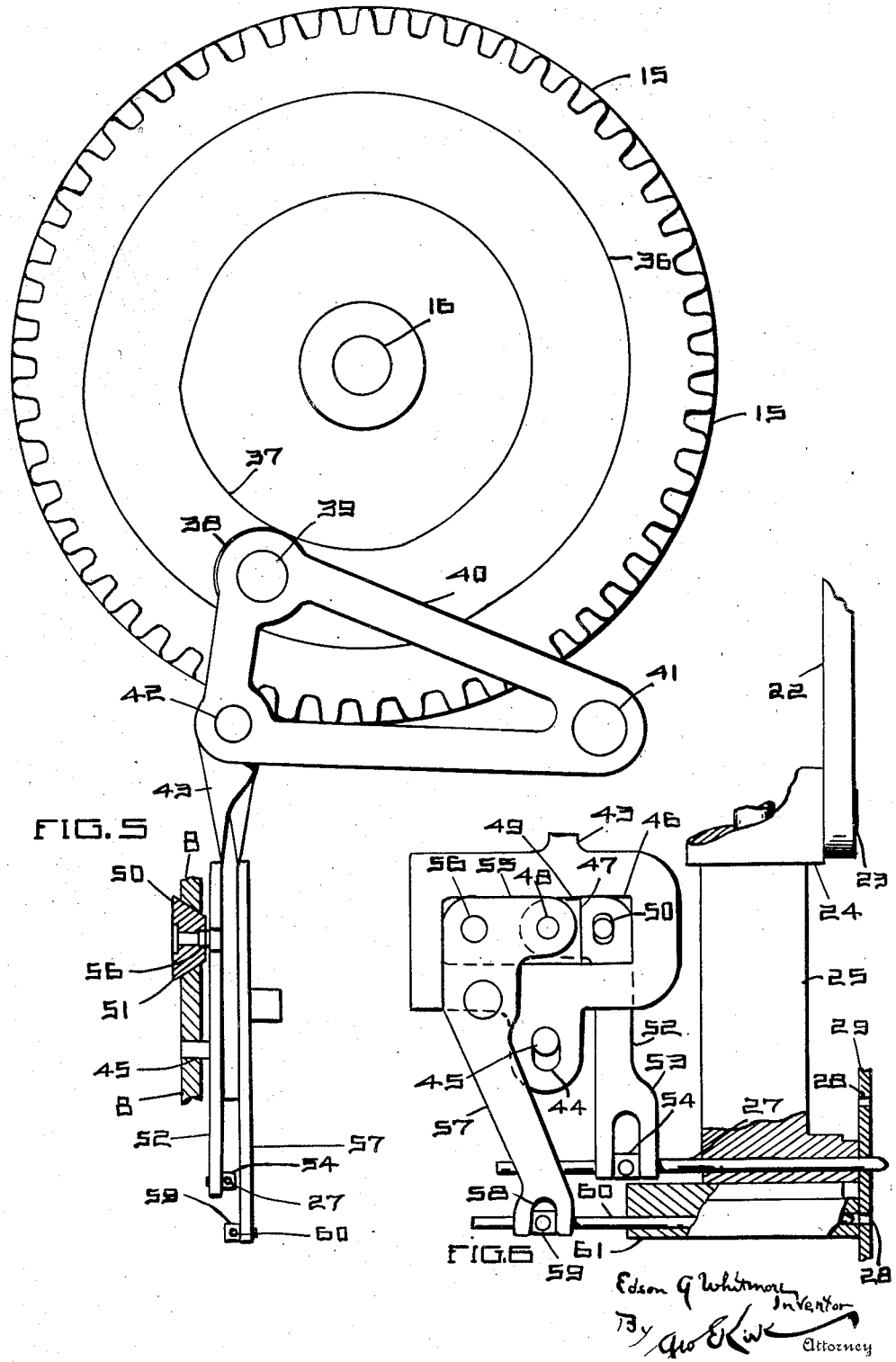

Patented May 29, 1923.

1,457,012

UNITED STATES PATENT OFFICE.

EDSON G. WHITMORE, OF POINT PLACE, OHIO, ASSIGNOR TO THE PICTURES DEVELOPMENT CO., OF TOLEDO, OHIO, A CORPORATION OF OHIO.

MOTION-PICTURE APPARATUS.

Application filed January 27, 1919. Serial No. 273,342.

*To all whom it may concern:*

Be it known that I, EDSON G. WHITMORE, a citizen of the United States of America, residing at Point Place, Lucas County, Ohio, have invented new and useful Motion-Picture Apparatus, of which the following is a specification.

This invention relates to step by step or intermittent driving mechanisms, especially as to quiet operating controls synchronizing the driving and holding operations for reliable alternation at speeds upward of ten each per second.

This invention has utility when incorporated in record handling apparatus, especially for view exhibitors, as in motion picture machines, being peculiarly adapted to disk record devices.

Referring to the drawings:

Fig. 1 is a fragmentary front elevation of an embodiment of the invention in a disk record motion picture machine;

Fig. 2 is a detail, with parts broken away, of the actuating element connections for the transmission mechanism and the control mechanism;

Fig. 3 is a side elevation of the transmission mechanism;

Fig. 4 is a section on the line VI—VI, Fig. 3;

Fig. 5 is a side elevation of the control mechanism; and

Fig. 6 is a fragmentary detail of the transmission and control mechanism connections adjacent the driven member.

The housing for the apparatus may include a base 1 upon which is mounted a motor 2 having a flywheel 3 to assist in carrying over the load disturbances of intermittent driving operations. This motor 2 actuates shaft 4 having bevel pinion 5 in mesh with bevel pinion 6 on vertical shaft 7 in upright frame 8. This vertical shaft 7 has skew pinion 9 thereon in mesh with skew pinion 10 for rotating shutter disk 11 having openings 12 therein movable past light line 13 of view taking or view projecting.

Near its upper extremity, the shaft 7 has thereon another skew pinion 14 in mesh with rotary driving member or skew gear 15 having bearing 16 in the frame 8. Diametrically extending across the face of the gear 15 opposite its bearing 16 is a guide 17 with which coacts roller 18 on crank 19 having its hub 20 mounted in the frame 8 in a position eccentric to the bearing 16 (Figs. 2, 3). Remote from the crank 19, this hub device 20 has a second crank or eccentric wrist pin 21 from which downwardly extends link 22.

In the rotation of the gear 15 variable angular velocity is transmitted to the device 20, which is further accentuated for giving a quick pull stroke to the link 22, by the disposal of the crank 21 in its angular position as to the crank 19. The link 22 is connected to bearing 23 on collar 24 fast with cylinder 25 which has transverse guide 26 for a pull pin 27, which when in a seat 28 of the spiral series of seats in rotatable driven member or master disk 29 transmits in its pull stroke a quick step or travel in the intermittent driving of this member 29 from the member 15. The member or master 29 is mounted on holder shaft 30, mounting a disk record or film 31 (Fig. 1). Carrier bracket 32 for the record holder 31 may move along on guide rods 33, 34, between frame 35 and frame 8, as controlled by the spiral series of seats 28 in the master disk 29.

The control of the connection of the pull means or pin 27 with the driven member 29, as well as the holding of the member 29 during recover stroke of the pull means or reciprocable device of the transmission mechanism, is dominated from the driving member 15, with positive synchronism of this control mechanism as to the transmission mechanism.

The driving member or gear 15 on its face carrying the bearing 16, has an endless guide way or cam having long arc shorter radius portion 36 and short arc longer radius portion 37 in which travels roller 38 on pin 39 of oscillating lever or rocker 40 having fixed fulcrum bearing 41 in frame 8 (Figs. 1, 2, 5). This lever 40 has pin 42 mounting link 43 for reciprocation. The link 43 has adjacent its lower extremity a slot 44 with which engages a pin 45 fast in the frame 8, thus holding the link in definite travel positions for the variable angular velocity reciprocation control as transmitted thereby.

Intermediate its length, the link 43 has a transversely extending way or guide 46 in which is mounted a slide block 47 having bearing pin 48 connected to arm 49 of a lever having normally fixed fulcrum pin 50 in slide block 51 mounted in the frame 8. Arm 52 of angle lever 49, 52, has deeply forked free end 53 engaging block 54 fixed with the connecting device or pull pin 27. Accordingly the short radius cam portion 36 effective in lifting the link 43 in thus raising the lever arm 49, moves its integral arm 52 away from the dash pot cylinder 25, thereby withdrawing the pin means 27 from an opening 28 and holding such pin withdrawn from engagement with the driven member 29 except during the portion of the rotation of the driving member 15 which brings the roller 38 to travel on the longer radius portion 37 of the cam on the gear 15, when the lever 40 is oscillated downward, to force the link 43 in moving bearing 48 of lever arm 49 downward, thus throwing the lever arm 52 toward the cylinder 25 to carry the pull means pin 27 into an opening 28 of the driven member 29.

Simultaneously with the foregoing control there is control of the holding of the member 29 while the pin 27 is withdrawn therefrom. The pin 46, extending through the block 47, provides bearing for arm 55 of lever having fixed fulcrum pin 56 extending through guide opening 46 of the link 43 to engage in normally stationary slide block 51. The arm 55 with downwardly extending arm 57 form an angle lever oppositely disposed as to the lever 49, 52, which is simultaneously oppositely movable. The lower free end of the angle lever arm 57 has fork 58 engaging block 59 fixed with reciprocable holding pin 60 reciprocable in fixed block 61 to enter an adjacent second seat 28 in the member 29 before the pin 27 is withdrawn, and to be withdrawn from a seat 28 after the pin 27 has entered the adjacent intermediate seat 28 but before the reciprocation travel of the link 22 is effective in lifting to shift the member 29 a step forward. The variable angular velocity transmission mechanism has its member 22, notwithstanding the uniform angular velocity of the gear 15, approximate a period of rest during the connection and disconnection travel intervals of the pin 60, while its maximum travel rate is in the lift while the pin 27 is engaged in the member 29, the recover travel, being idle, may be and as herein designed is at a slower rate.

There is accordingly provided with the single uniform angular velocity driving source of gear 15, two variable angular velocity transmission mechanisms, one through the device 20 for giving the driving or pull actuation of engaged pin 27 for intermittently shifting master disk 29, and the other controlling the position of such pin 27 for engagement or release, and supplemented by a stationary anchoring device as the pin 60. While there is considerable variation in the load upon the gear 15 in a single rotation, the control mechanism disclosed for converting the rotary motion to reciprocatory is positive with two points of rest. During these two rest points of the control mechanism, the transmission is timed to act. The eccentrically disposed double crank device 20 responds to the demand of this long quick pull for driving the member 29 a step at a time, and the pin 60 insures holding during the recover travels of the pin 27.

What is claimed and it is desired to secure by Letters Patent is:

1. A rotary driving member having on opposite sides thereof guide means, rock arms engaged by the guide means, a driven member, holding means for the driven member actuable by one rock arm, and actuating means for the driven member actuable by the other rock arm.

2. A variable angular velocity transmission mechanism including a rotary member having a diametrically extending guide, eccentrically of said member, a crank, and a bearing for the crank in which the crank is rotated by said guide, and an eccentric pin carried by the bearing and connected to be actuated by the crank.

3. A variable angular velocity transmission mechanism including a rotary member having a diametrically extending guide, a double crank device having a fixed bearing, a first crank coacting with the guide, and a link coacting with the second crank.

4. A variable angular velocity transmission mechanism including a rotary member having a transversely extending guide, a double crank device having a fixed bearing, a first crank coacting with the guide, a link connected to the second crank of the device, and a pull pin actuated by the link.

5. A transmission mechanism including a rotary member having a transversely extending guide, a double crank device having a first crank coacting with the guide, a link connected to the second crank of the device, a pull pin actuable by the link, and control means for shiftig the pin into and out of pull effecting position.

6. A transmission mechanism including a rotary member having a guide, a double crank device having a first crank coacting with the guide, a pull pin reciprocable by the second crank of the device, and control means for shifting the pin between reciprocations thereof.

7. A driving member, a driven member, transmission mechanism therebetween including a rotary element having a guide, a double crank device having a first crank coacting with the guide, a pull pin reciprocable by the second crank of the device, and control mechanism from the driving member shifting the pin out of pull position as to the driven member in one direction of pin reciprocation.

8. A driving member, a driven member, transmission mechanism therebetween including a rotary element having a guide, a double crank device having a first crank coacting with the guide, pull means reciprocable by the second crank of the device into and out of actuating engagement with the driven member, and control mechanism from the driving member holding the pull means in actuating engagement with the driven member in one direction of the reciprocation of the pull means and holding said pull means out of actuating engagement with the driven member in the other direction of the reciprocation of the pull means.

9. A rotary driving member, a driven member, variable angular velocity transmission mechanism therebetween, and linkage mechanism from the driving member intermittently connecting the transmission mechanism to the driven member and including a rock arm, a link therefrom providing a guide, and a lever engaging said guide to be swung thereby.

10. A rotary driving member, a driven disk record carrying member, transmission mechanism therebetween including a reciprocable device for actuating the driven member, and mechanism from the driving member including a rocker, a guide link therefrom, and a guide link actuated lever for connecting the device to the driven member in one direction of its reciprocation.

11. A driving member, a driven disk record carrying member, variable velocity transmission mechanism therebetween including a reciprocable device for actuating the driven member, and mechanism from the driving member including a rocker, a guide link, a driven member engaging pin, and a lever coacting with the guide of the link and engaging the pin for throwing the pin in connecting the device to the driven member in one direction of its reciprocation and disconnecting it in the other direction of its reciprocation.

12. A driving member, a driven disk record carrying member, transmission mechanism therebetween, and connection controlling mechanism for the transmission mechanism, said connection controlling mechanism actuable from the driving member and including a cam, a rocker actuable by the cam, a link connected to the rocker and providing a guide, a lever coacting with the link guide, and a pin connected to the lever for shifting to engage the driven member.

13. A rotary driving member, a driven member, transmission mechanism therebetween, and connection controlling mechanism for the transmission mechanism including a cam actuable by the driving member, a rocker coacting with the cam, and linkage from the rocker to the transmission mechanism for controlling the connection of the transmission member to the driven member.

14. A rotary driving member, a driven member, transmission mechanism therebetween, and connection controlling mechanism for the transmission mechanism including a cam actuable by the driving member, an oscillating lever coacting with the cam, and linkage reciprocable by the lever and coacting with the transmission mechanism.

15. A driving member, a driven member, and connection controlling mechanism therebetween including a cam actuable by the driving member, an oscillating lever coacting with the cam, a link reciprocable by the lever, a second lever rockable by the link, and member connecting means controlled by the second lever.

16. A driving member, a driven member, transmission mechanism therebetween, and connection controlling mechanism for the transmission mechanism including a cam actuable by the driving member, a first lever coacting with the cam, a link therefrom, and second and third levers oppositely rockable by the link and coacting with the transmission mechanism.

17. A rotary driving member, a driven member, and connection controlling mechanism therebetween including a link, a pair of oppositely rockable levers actuable by the link, transmission mechanism from the driving member including driven member engaging means controllable by the levers, one of said levers in one position holding the driven member while the driven member engaging means is free therefrom.

18. A rotary driving member, a driven member, intermittent transmission mechanism therebetween, and controlling mechanism for the transmission mechanism comprising a pair of oppositely rockable levers actuable from the driving member, one of said levers having driven member holding means and the other lever coacting with the transmission mechanism for connecting and disconnecting the driven member for actuation.

19. A driving member, a step by step actuable driven disk record carrying member, and two mechanisms between the members, one of said mechanisms embodying guides, pins in said guides, and levers for shifting the pins into and out of engagement with the driven member, and the other mechanism having connection with one of said guides for shifting said guide engaged pin and the driven member.

20. A disk record holder, a spiral seat carrying master axially spaced away from the record holder, a driving member, control mechanism from the member including a pin for holding the master, and relatively movable transmission mechanism from the member including a plunger providing a guide for the pin, said pin being connectible by the control mechanism for driving the master.

21. A disk record holder, a coaxial spiral seat carrying master axially spaced away from the record holder, a rotary driving member, control mechanism from the member including pins coacting intermittently to engage the master, and relatively movable transmission mechanism from the member including a rocker, and a plunger guide for a master engaging pin coacting during the intermissions of master release to actuate the master.

22. A motion picture machine comprising a disk record holder, a master disk coaxial with the holder and provided with a spiral series of openings therein, said means being axially spaced from the record holder, a pull pin reciprocable into and out of opening engaging position, and relatively movable means for transmitting actuating travel to said pin including a driving guide, an eccentrically disposed crank rotatable by said guide, a link, and a pin engaging plunger connected to the link.

23. A motion picture machine comprising a disk record holder, a master disk coaxial with the holder and provided with a spiral series of seat providing openings therein, said means being axially spaced from the record holder, a holding pin reciprocable into and out of opening engaging position, and relatively movable means for controlling the position of said pin including a multiple radius actuating cam, a rocker engaging the cam, a link from the rocker, and a pin throwing lever actuable by said link.

24. A motion picture machine comprising a disk record holder, a master disk coaxial with the holder and provided with a spiral series of seat providing openings therein, actuating mechanism for the disk including a pull pin reciprocable into and out of opening engaging position, a rotary diametrical driving guide, an eccentric crank device actuable by said guide, and linkage from the device to the pin, and control mechanism including a holding pin for the master disk and linkage reciprocating said pins oppositely simultaneously.

25. A member for intermittent actuation, and actuating mechanism therefor including a rotary driver provided with a transverse guide, an eccentrically disposed crank coacting with the guide, a fixed bearing in which the crank is rotated by the guide, and connecting means reciprocable by the crank for coacting with the member.

26. A member for intermittent actuation, and actuating mechanism therefor including a rotary driver provided with a transverse guide, a double crank eccentrically disposed as to the driver, a fixed bearing in which the crank is rotated by the guide, and connecting means reciprocable by the crank for coacting with the member.

27. A member for the intermittent actuation, and actuating mechanism therefor including a rotary driver provided with a diametrical guide, a double crank operable from the guide, a fixed bearing in which the crank is rotated by the guide, and connecting means reciprocable by the crank for coacting with the member.

28. A member for intermittent actuation, and actuating mechanism therefor including a rotary driver provided with a diametrical guide, a double crank device having a first crank engaging the guide to be operated thereby, a fixed bearing in which the crank is rotated by the guide, and connecting means extending from the second crank of the device for reciprocation thereby to coact with the member.

29. A disk record carrying member for intermittent actuation, and control mechanism therefor including a rotary driver provided with an endless guide, rocker engaging the guide to be operated thereby, a slotted link coacting with the rocker, a lever engaging the link slot, and a pin engaged by the link and shiftable into and out of engagement with the member.

30. A disk record carrying member for intermittent actuation, and control mechanism therefor including a rotary driver provided with an endless variable radius guide, a shiftable rocker engaging the guide to be operated thereby, a link connected to the rocker, and having a transverse slot, and a pair of levers oppositely rockable by coacting with the link slot for engaging and disengaging the member.

31. A disk record carrying member for intermittent actuation, actuation and control mechanism therefor including a rotary driver provided with actuating and control devices for the member independently extending from the member to the driver, one device including a pin guide, and the other device including means for shifting the pin as to said guide.

32. A disk record carrying member for intermittent actuation, actuation and control mechanism therefor including a rotary driver provided with an actuating device on one side of the driver, and a control device on the other side of the driver, said actuating device including a rocker provided with an eccentric, a link therefrom, a plunger engaged by the link, said plunger providing a guide, and a pin in the guide; and said control device including a rocker, a link therefrom, and a lever from the link for reciprocating the pin in said guide.

33. A member for intermittent actuation, actuation and control mechanism therefor including a rotary driver provided with a diametrical guide on one side thereof and an endless variable radius guide on the other side thereof, devices engaging the guides to be operated thereby, and means extending from the devices to the member for driving and holding the member.

34. A member for intermittent actuation, control mechanism therefor including a rotary driver provided with an endless variable radius guide, a lever engaging the guide to be rocked thereby, a link actuable by the lever, and an angle shiftable by the link to control the member.

35. A member for intermittent actuation having a series of seats, actuation and control mechanism including seat coacting means, and a rotary driver to which the actuation mechanism is connected, and control devices embodying a rocker, a guided link, and levers for oppositely shifting said seat coacting means as actuable from the driver for controlling the means.

36. A rotatable disk record carrying member for intermittent actuation having a spiral series of seats, actuation and control mechanism including a pair of seat coacting pins, a rotary driver provided with a diametrical guide, a double crank device having a first crank coacting with the guide, connecting means extending from the second crank of the device for laterally actuating a pin in effecting shifting of the member, said driver also having a variable radius endless guide, a lever rocked thereby, and transmission mechanism from the lever alternately shifting the pins longitudinally into and out of seating engagement with the member.

In witness whereof I affix my signature.

EDSON G. WHITMORE.